(12) United States Patent
Happonen

(10) Patent No.: US 6,240,127 B1
(45) Date of Patent: May 29, 2001

(54) METHOD FOR REDUCING INTERFERENCE, AND SYNTHESIZER ARRANGEMENT

(75) Inventor: Aki Happonen, Kiiminki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/434,183

(22) Filed: Nov. 4, 1999

Related U.S. Application Data

(63) Continuation of application No. PCT/FI99/00169, filed on Mar. 4, 1999.

(30) Foreign Application Priority Data

Mar. 5, 1998 (FI) .......................................... 980509

(51) Int. Cl.[7] .............................. H04B 15/00; H04K 1/00; H04L 27/30
(52) U.S. Cl. ........................... 375/132; 375/373; 327/129
(58) Field of Search .................................. 375/132, 135, 375/136, 371, 373; 331/14, 17, 18; 332/144, 145; 327/129, 107, 105

(56) References Cited

U.S. PATENT DOCUMENTS

| 4,901,265 | 2/1990 | Kerr et al. . |
|---|---|---|
| 5,235,613 | 8/1993 | Brown et al. . |
| 5,426,392 | 6/1995 | Kornfeld . |
| 5,521,534 * | 5/1996 | Elliott .................................. 327/129 |
| 5,539,769 | 7/1996 | Kosko et al. . |

FOREIGN PATENT DOCUMENTS

| 858170 | 8/1998 | (EP) . |
|---|---|---|
| 9808315 | 2/1998 | (WO) . |

\* cited by examiner

*Primary Examiner*—Chi Pham
*Assistant Examiner*—Phuong Phu
(74) *Attorney, Agent, or Firm*—Altera Law Group, LLC

(57) ABSTRACT

The invention relates to a method for reducing interfering signals from an output signal of a digital synthesizer arrangement and to a synthesizer arrangement which comprises a reception means (10) which receives a signal which determines the frequency of the output signal to which is added a signal which breaks the periodicity of the signal. The arrangement comprises a means (40) which forms, on the basis of the received signal, a signal which comprises the information on the phase used in the output signal, a generator means (60) which forms a pseudo-random signal, a summing means (20) which forms a sum signal by adding the signal comprising the phase information to the signal used in determining the frequency and to the pseudo-random signal, and in which means part of the signal formed by the means (40) is added to a next sum signal.

20 Claims, 2 Drawing Sheets

METHOD FOR REDUCING INTERFERENCE, AND SYNTHESIZER ARRANGEMENT

This application is a continuation of international application serial No. PCT/FI99/00169, filed Mar. 4, 1999.

FIELD OF THE INVENTION

The invention relates to a method for reducing interfering signals from an output signal of a digital synthesizer arrangement, the frequency of the output signal being determined by a signal which is supplied to the arrangement and to which signal is added a signal which breaks the periodicity of the signal.

BACKGROUND OF THE INVENTION

In radio systems, various frequency synthesis methods are used which employ, for instance, a reference signal source or a control signal by means of which one or more frequencies are generated. In a digital frequency synthesis, commonly used methods include DDS (Direct Digital Synthesis) and NCO (Numerically Controlled Oscillator) methods. Particularly in a radio system using frequency hopping, the synthesizer which performs the synthesis must be capable of becoming tuned quickly in small frequency steps over the entire frequency band. Synthesis methods are used together with various modulation methods.

Converting digital frequency information into analog in a DA converter is one of the drawbacks of the frequency synthesis. The conversion of a signal into analog has contributed to the generation of interfering signals in the output of the synthesis arrangement. Interfering signals have also been generated in an AD-converted signal. The interfering signals have caused interference peaks in the spectrum of the output signal of the synthesizer arrangement. If the interfering signals have exceeded the limits for interfering signals mentioned in the recommendations, the operation of some parts of the radio system has been impaired or possibly hindered altogether.

In frequency synthesis arrangements, various methods are used for reducing interfering signals in the output signal. A known method employs a digital frequency word by which the frequency of a signal obtained from the output of the arrangement is determined. In the method, the periodicity of the signal is broken, which results in fewer potential interfering signals in the output signal. The signal is broken at every clock cycle. The value of a breaking signal varies in such a manner that at every other clock cycle the value is a logical zero, and at every other clock cycle the value is a logical one.

The problem of the method described above is that the signal breakage has not been sufficiently efficient. Consequently, the output signal includes interfering signals even after the breakage.

BRIEF DESCRIPTION OF THE INVENTION

An object of the invention is thus to provide a method and a synthesizer arrangement so as to solve the above-mentioned problems. This can be achieved by a method of the type described in the introduction, the method being characterized by forming a signal which comprises the information on the phase of an output signal of the arrangement, forming a pseudo-random signal, adding the signal which comprises the phase information to the signal used in determining the frequency and to the pseudo-random signal in order to form a sum signal, feeding back part of the signal which comprises the phase information on the output signal to form a next sum signal.

The invention further relates to a synthesizer arrangement which is used for reducing interfering signals from an output signal of a digital synthesizer and which comprises a reception means which receives a signal determining the frequency of the output signal, a signal which breaks the periodicity of the signal being added to the received signal.

The synthesizer arrangement is characterized in that the arrangement comprises a means which forms, on the basis of the received signal, a signal which comprises the information on the phase used in the output signal, a generator means which forms a pseudo-random signal, a summing means which forms a sum signal by adding the signal which comprises the phase information to the signal used in determining the frequency and to the pseudo-random signal, and in which summing means part of the signal formed by the means is added to a next sum signal.

The preferred embodiments of the invention are disclosed in the dependent claims.

The invention is based on the idea that a pseudo-random signal is added to a frequency word, and after the addition, the signal comprising the pseudo-random signal is forwarded and added to next pseudo-random signals.

Several advantages can be achieved by the method and arrangement of the invention. In the method, the periodicity of the signal is effectively broken, whereby the generation of interfering signals in the spectrum of an output signal of the arrangement is prevented. The efficiency of breaking the periodicity is based on the fact that a pseudo-random signal is added to a sum signal for the formation of which the pseudo-random signal has already been used.

Furthermore, the method enables the frequency of the output signal to be changed in small frequency steps over an entire frequency band. The arrangement is relatively easy to implement for instance by discrete components. The arrangement can be implemented relatively easily on DDS or NCO systems already in use. A wider dither-free range can be achieved by means of the arrangement than by the known methods, and the arrangement can thus be implemented using fewer bits.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 1:
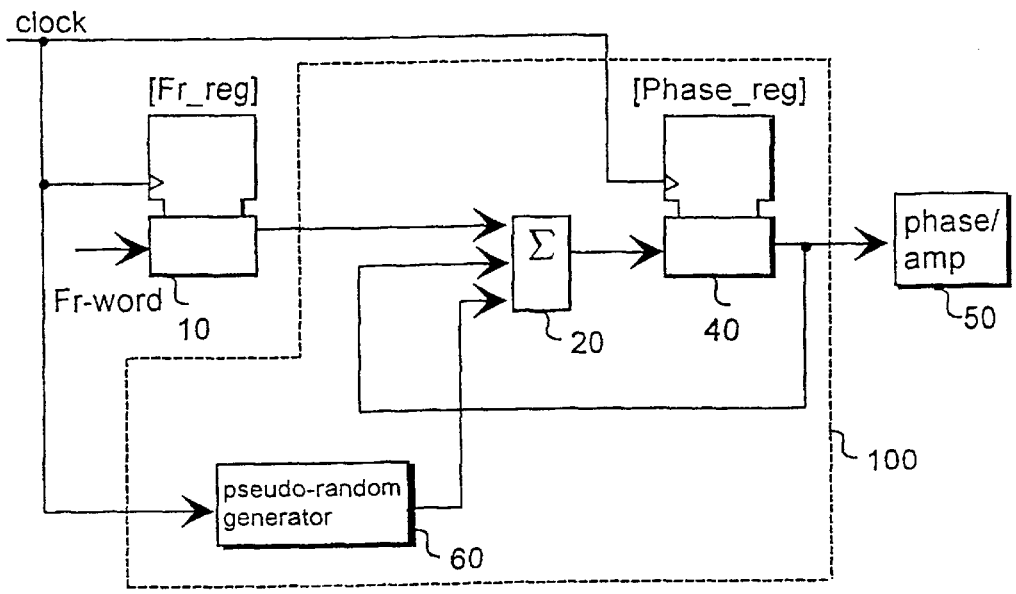
FIG. 1 shows a first embodiment of a synthesizer arrangement in accordance with the invention.

FIG. 1 shows a first embodiment of a synthesizer arrangement 100 in accordance with the invention. The synthesizer arrangement 100 comprises a reception means 10, a first summing means 20, a means 40, a converter 50 and a signal generator means 60. In the arrangement in accordance with the figure, the output of the reception means 10 is connected to the input of the first summing means 20. The output of the summing means 20 is connected to the input of the means 40. The output of the means 40 is connected to the input of the converter 50 and to the input of the first summing means 20. The generator means 60 is connected with the input of the first summing means 20. The means 10, 40, 60 included in the arrangement are synchronized to operate on the same clock signal.

The phase information on the signal is stored in the means 40, and the information is read by a signal coming to the means 40. The converter 50 converts a phase signal coming from the means 40 into amplitude information. In practice, the converter 50 operates as a phase-amplitude converter. The generator means 60 forms a signal which is added in the first summing means 20 to an output signal of the reception means 10 and to a signal obtained from the output of the means 40.

The synthesizer arrangement 100 is preferably used for instance in DDS or NCO systems. By means of the arrangement, the spectrum of an out-put signal of the DDS or NCO systems can be made interference-free. The DDS and NCO systems are preferably implemented by means of an ASIC circuit, for example.

The synthesizer arrangement operates in the following manner. The reception means 10 receives a digital signal which is typically a digital frequency word of a predetermined size. The digital frequency word comprises the information on the frequency used in an output signal of the synthesizer arrangement. In practice, the frequency word comprises the absolute frequency information on the output signal. The frequency word is first loaded into the reception means 10 which is implemented for instance by a parallel-register. The width of the frequency word can be for instance 24 bits. The reception means 10 feeds the frequency word to the first summing means 20 which also receives the signal from the output of the means 40. The summing means 20 sums the frequency word and the signal coming from the output of the means 40 into a sum signal. The generator means 60 breaks the sum signal. The breaking takes place in such a manner that the generator means generates a pseudo-random signal which is added to the sum signal in the summing means 20.

The sum signal comprising a pseudorandom signal is connected to the means 40 which comprises the phase information on the signal. The means 40 can be implemented for instance by a parallel-register. If the size of the word of the signal received by the means 10, 40 is increased, the smaller the frequency difference needed to increase or decrease the frequency of the output signal. The size of the frequency word affects the amount of the phase information retrieved from the means 40. The operation of the means 40 can be explained for instance by means of a unit circle. The different phases of the signal can be described by means of values of the unit circle curves. When the signal phase exceeds 360 degrees, a situation called overflow follows.

The frequency word is reloaded into the reception means 10 each time when the frequency of the output signal is to be changed. When the value of the frequency word increases, the phase change of the signal per a clock signal cycle increases, whereby the frequency of the signal after the phase-amplitude change also increases.

Figure 2:
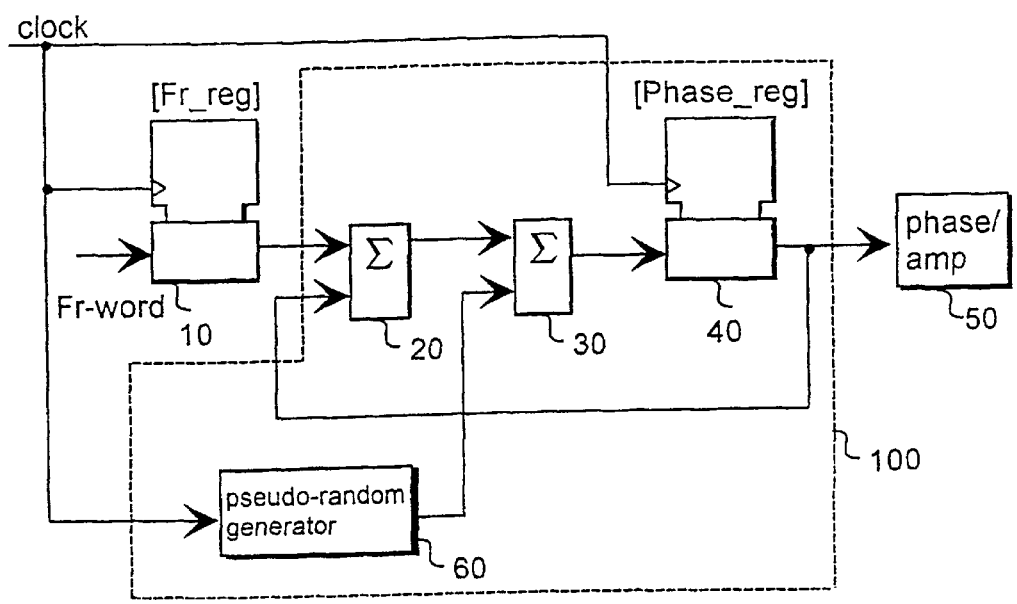
FIG. 2 shows a second embodiment of the synthesizer arrangement in accordance with the invention.

FIG. 2 shows a second embodiment of the synthesizer arrangement of the invention. The synthesizer arrangement comprises a second summing means 30 which receives a signal from the first summing means 20 and the generator means 60. In this embodiment, the first summing means 20 receives a signal from the output of the receiver 10 and from the output of the means 40. The first summing means 20 sums the received signals into a partial sum signal which is forwarded to the second summing means 30.

The signal generator means 60 generates a pseudo-random signal which is added in the second summing means 30 to the partial sum signal formed by the first summing means 20. The sequence of the pseudo-random signal is not previously known. The addition of the pseudo-random signal breaks the periodicity of the partial sum signal very efficiently. The summing means 30 forms an actual sum signal by adding together the partial sum signal and the pseudo-random signal, whereby the sum signal also includes a breaking signal.

In the present arrangement, signal periodicity is broken more often than in the prior art arrangements. Breaking the periodicity prevents interfering signals from being generated in the spectrum of an output signal. An output signal of the summing means 30, which signal includes the pseudo-random signal, is conveyed to the means 40 which forms, by means of the received signal, a signal which comprises the phase information of the output signal. The signal which comprises the phase information is conveyed to the converter 50 which converts the phase information into amplitude information. The synthesizer arrangement thus employs "frequency-dithering" in which the frequency word is broken by adding the pseudo-random signal to the frequency word.

In the means 20, part of the output signal of the means 40 is added to the output signal of the reception means 10. The means 20 thus forms the partial sum signal which includes the pseudo-random signal. The second summing means 30 adds the pseudo-random signal generated by the generator means to the partial sum signal. Hence, the second summing means 30 receives a signal which includes two pseudo-random signals. Of these two signals, the pseudo-random signal has already been added to the partial sum summing means 20. The addition of the fed back output signal from the means 40 in the summing means 20 to the received signal from reception means 10, on the basis of which the current phase information signal is formed, the phase information enables the pseudo-random signal also to affect the phase information on signals to be formed later. The feedback enables the effect of the pseudo-random signal to be maintained in the memory of the arrangement. This means that the pseudo-random signal generated by the generator means 60 is added to the signal to which the pseudo-random signal has already been added at least during the previous clock cycle. The efficiency of breaking the signal is thus based on the fact that the pseudo-random signal is used for breaking the signal which includes the pseudo-random signal that has already been added.

In the following, a formula (1) is shown to illuminate how a signal which comprises the phase information is formed. The formula shows that the next phase information is formed on the basis of the phase information preceding said phase information. The signals shown in the formula are discrete signals.

$$y[n]=x[n]+y[n-1]+s[n], \tag{1}$$

where
y[n] is phase information,
x[n] is a signal which determines the frequency,
y[n−1] is phase information preceding the phase information y[n],
s[n] is a random signal.

At least in the long run, the generator means 60 keeps the mean value of the pseudo-random signal generated as close to zero as possible. The addition of the pseudo-random signal can increase or decrease the sum signal. If the mean value of the pseudo-random signal deviates sharply from zero in the long run, the reception means 10 change the value of the signal received. In other words, the reception means 10 compensate for the deviation from zero. The generator means 60 can readily be implemented by, for instance, a shift register coupled in series and an XOR circuitry which connects the signal back to the shift register. The size of the pseudo-random signal generated by the generator means 60 is smaller compared with the signal which determines the frequency, which means that adding the pseudo-random signal does not cause any serious frequency error.

Figure 3:
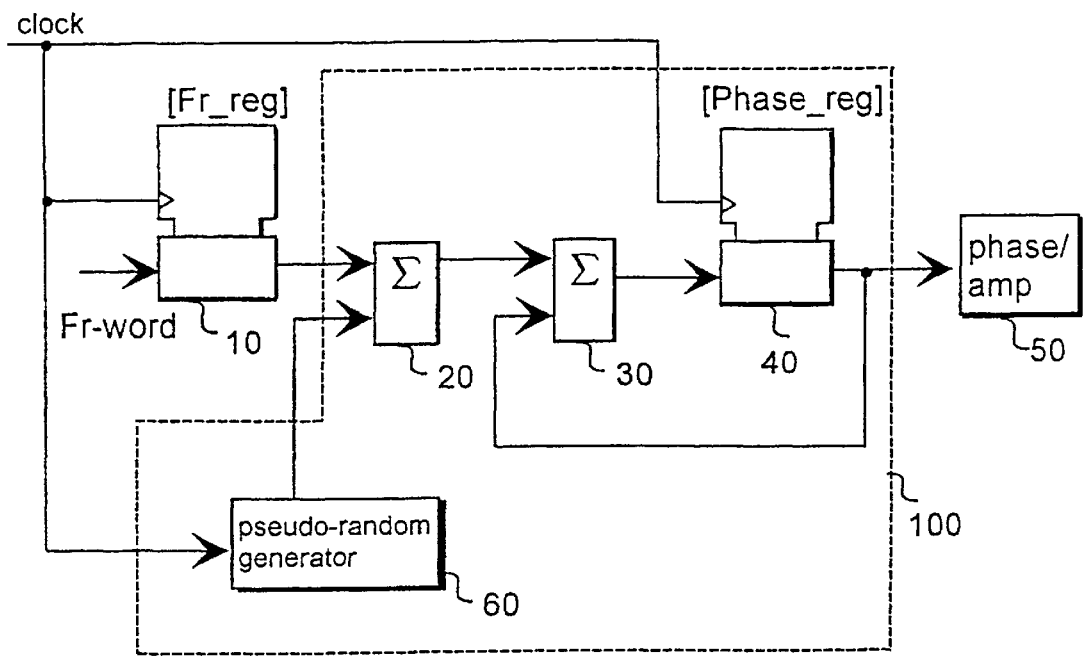
FIG. 3 shows a third embodiment of the synthesizer arrangement in accordance with the invention.

FIG. 3 shows a third embodiment of the synthesizer arrangement in accordance with the invention. In this arrangement, the first summing means 20 sums the pseudo-random signal generated by the generator means 60 and the signal obtained from the output of the reception means 10 into a partial sum signal. In other words, in the arrangement a broken signal is formed by adding the pseudo-random signal to the signal used in determining the frequency. The second summing means 30 forms an actual sum signal by summing the partial sum signal and the signal obtained from the output of the means 40. Next, the actual sum signal is conveyed to the means 40.

Figure 4:
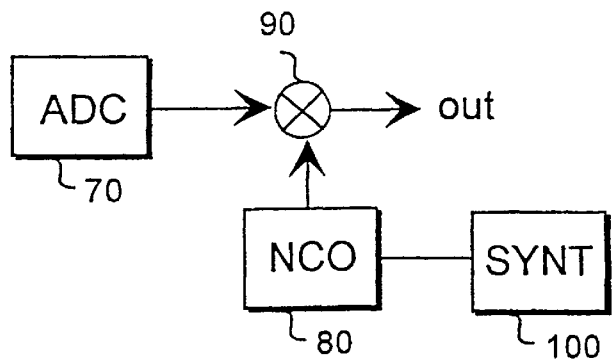
FIG. 4 shows an oscillator arrangement employing the method in accordance with the invention.

FIG. 4 shows an oscillator arrangement employing the method in accordance with the invention. The oscillator arrangement comprises a converter 70, a means 80, a multiplier 90 and a synthesizer arrangement 100. The outputs of the converter 70 and the means 80 are connected to the multiplier 90. The synthesizer arrangement 100 in accordance with the invention is connected to the means 80 which is implemented by means of an NCO oscillator. In the solution in accordance with the figure, the converter 70 receives an analog signal and converts the signal into a digital one. Next, the converter 70 feeds the digital signal formed to the multiplier 90 which forms an output signal from the signal converted by the converter 70 and the signal coming from the means 80. The synthesizer arrangement 100 forms an interference-free signal to the means 80, in which case interference can also be prevented from being generated in the output signal of the multiplier 90.

The arrangement shown in FIG. 4 is used for instance in a base station of a cellular radio system. More specifically, the solution is used for instance in down-multiplying the signal received from a radio path by the base station. An arrangement which is similar in principle can also be used in up-multiplying the signal. By means of the arrangement, the spectrum of the signal supplied from the means 80 to the multiplier can be made interference-free, in which case potential interference in the output signal of the multiplier 90 can also be reduced. The arrangement enables a wider dither-free range than the known solutions do. The arrangement can be implemented using fewer bits than in the known solutions.

Figure 5:
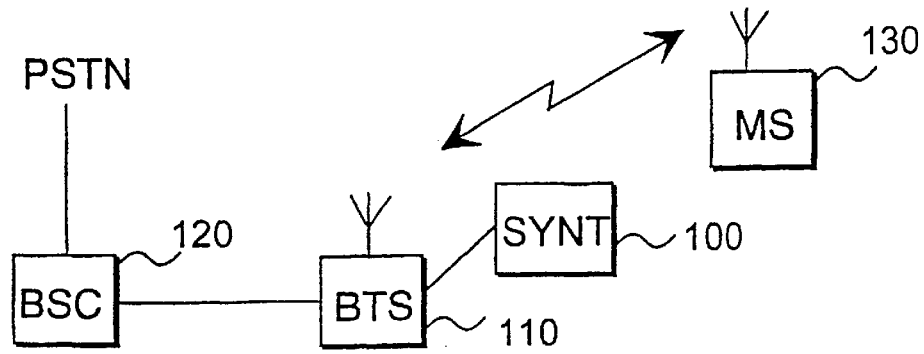
FIG. 5 shows a radio system employing the method in accordance with the invention.

FIG. 5 shows a radio system employing the method of the invention. The radio system comprises a synthesizer arrangement 100, a base station 110, a base station controller 120 and a subscriber terminal 130. The figure shows that the synthesizer arrangement 100 communicates with the base station. In practice, the synthesizer arrangement is positioned in the transmission and reception sides of the base station 110. The synthesizer arrangement 100 enables the base station 110 to form a high quality signal after down-multiplying the received signal. The synthesizer arrangement 100 also enables the base station 110 to transmit a signal with an interference-free spectrum to the radio path. The solution in accordance with the invention is most preferably used at least in the reception side of the base station 110.

Although the invention is described above with reference to the example in accordance with the accompanying drawings, it is obvious that the invention is not restricted thereto but it can be modified in various ways within the inventive idea disclosed in the claims.

What is claimed is:

1. A method for reducing interfering signals from an output signal of a digital synthesizer arrangement, the frequency of the output signal being determined by an input signal which is supplied to the arrangement and to which input signal is added a signal which breaks the periodicity of the output signal, the method comprising:
    forming a signal which comprises the information on the phase of the output signal;
    forming a pseudo-random signal, adding the signal which comprises the phase information to the signal used in determining the frequency and to the pseudo-random signal in order to form a sum signal; and
    feeding back part of the signal which comprises the phase information on the output signal to form a next sum signal.

2. A method as claimed in claim 1, wherein the phase used in the output signal is determined on the basis of the sum signal which includes the pseudo-random signal.

3. A method as claimed in claim 1, comprising forming a broken partial sum signal by adding the pseudo-random signal to the signal used in determining the frequency, forming the sum signal by adding the signal which comprises the phase information to the broken partial sum signal, and using the sum signal in the formation of the signal which comprises the phase information.

4. A method as claimed in claim 1, comprising forming a partial sum signal by adding together the signal which comprises the phase information and the signal used in determining the frequency, and forming an actual sum signal by adding the pseudo-random signal to the partial sum signal, and using the actual sum signal in the formation of the signal which comprises the phase information.

5. A method as claimed in claim 1, wherein the pseudo-random signal is added to a signal for the formation of which the pseudo-random signal has already been used.

6. A method as claimed in claim 1, wherein the mean value of the pseudo-random signal is kept as close to zero as possible at least in the long run.

7. A method as claimed in claim 1, wherein if, in the long run, the mean value of the pseudo-random signal deviates sharply from zero, the value of a word of a digital signal supplied to the arrangement is changed.

8. A method as claimed in claim 1, wherein the signal which comprises the phase information is converted into a signal which comprises amplitude information.

9. A method as claimed in claim 1, wherein the addition of the pseudo-random signal increases or decreases the signal used in the formation of the phase information.

10. A method as claimed in claim 1, wherein the method is used for forming an interference-free spectrum particularly in DDS or NCO systems.

11. A synthesizer arrangement which is used for reducing interfering signals from an output signal of a digital synthesizer and which comprises a reception means which receives an input signal determining the frequency of the output signal, and a signal which breaks the periodicity of the signal being added to the received signal, the arrangement being characterized in that it comprises:

a phase signal means which forms, on the basis of the received signal, a signal which comprises the information on the phase used in the output signal;

a generator means which forms a pseudo-random signal; and a summing means which forms a sum signal by adding the signal which comprises the phase information to the signal used in determining the frequency and to the pseudo-random signal, and in which summing means part of the signal formed by the phase signal means is added to a next sum signal.

12. A synthesizer arrangement as claimed in claim 11, wherein the synthesizer arrangement comprises a summing means which receives the pseudo-random signal and which adds the pseudo-random signal to the signal which comes from the summing means and to which the pseudo-random signal has already been added.

13. A synthesizer arrangement as claimed in claim 11, wherein the synthesizer arrangement comprises a summing means which receives the signal fed back by the phase signal means, which signal is further added by the summing means to the signal which comes from the summing means and to which the pseudo-random signal has already been added.

14. A synthesizer arrangement as claimed in claim 11, wherein:

the part of the signal formed by the phase signal means which is added to the next sum signal is a signal fed back from the phase signal means to the summing means; and the summing means sums the signal fed back and the received signal on the basis of which the phase information signal is formed, whereby the pseudo-random signal already added also affects phase information on output signals to be formed later.

15. A synthesizer arrangement as claimed in claim 11, wherein the phase signal means receives the sum signal which comprises the pseudo-random signal and forms the phase information on the output signal of the arrangement by the sum signal.

16. A synthesizer arrangement as claimed in claim 11, wherein the generator means keeps, at least in the long run, the mean value of the pseudo-random signal as close to zero as possible.

17. A synthesizer arrangement as claimed in claim 11, wherein if the mean value of the pseudo-random signal deviates sharply from zero, the reception means change the value of the signal received.

18. A synthesizer arrangement as claimed in claim 11, wherein the arrangement comprises a converter which receives the signal which comprises the phase information from the phase signal means, and which converts the phase information into amplitude information.

19. A synthesizer arrangement as claimed in claim 11, the summing means increases or decreases the value of the signal which comprises the phase information by adding the pseudo-random signal to the signal which comprises the phase information.

20. A synthesizer arrangement as claimed in claim 11, wherein the arrangement is used in DDS or NCO systems.

* * * * *